Figure 7:
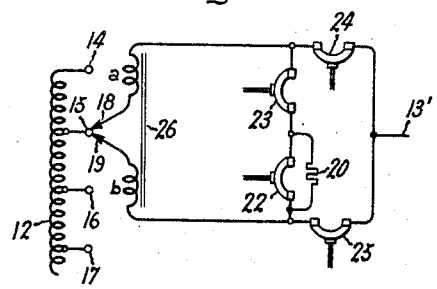

May 1, 1945.  L. F. BLUME  2,374,974
ELECTRIC CIRCUIT
Filed Oct. 22, 1942  2 Sheets-Sheet 1
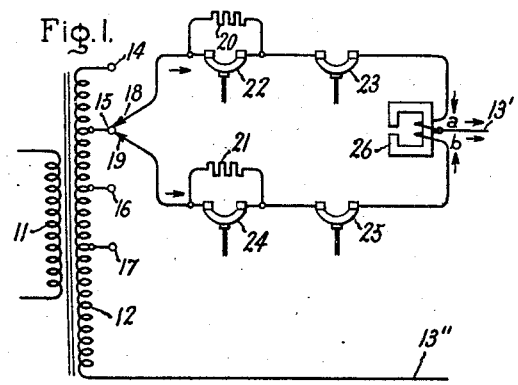
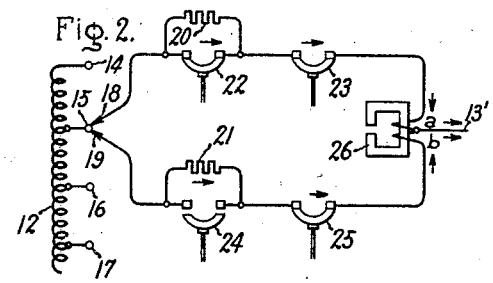
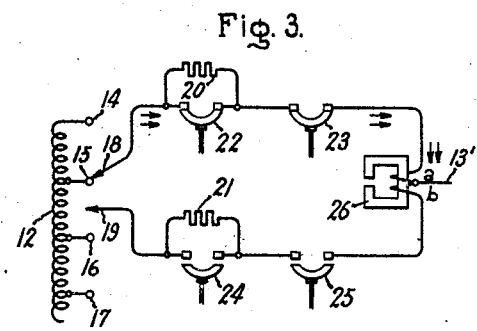
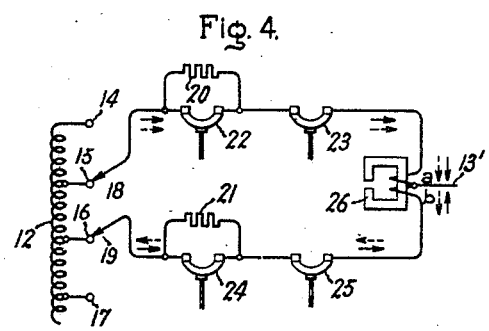
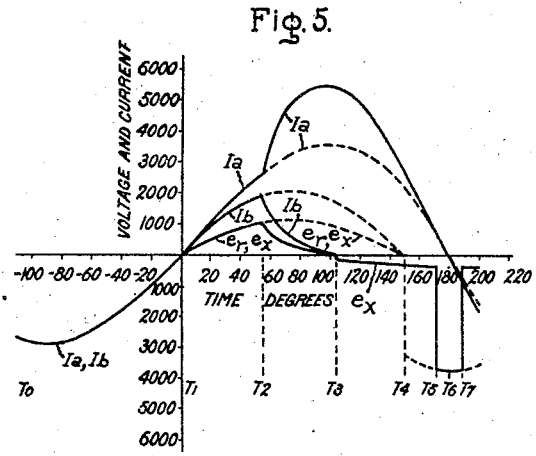
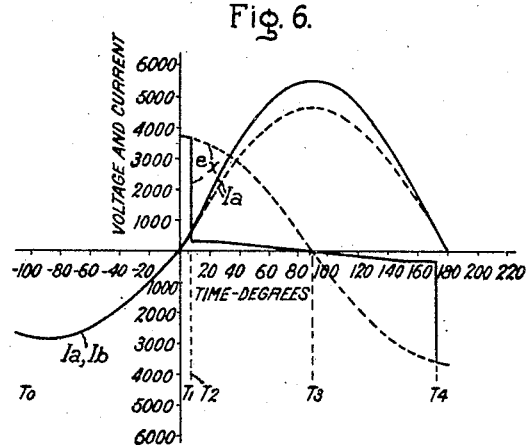
Inventor:
Louis F. Blume,
by Harry E. Dunham
His Attorney.

May 1, 1945.  L. F. BLUME  2,374,974
ELECTRIC CIRCUIT
Filed Oct. 22, 1942  2 Sheets-Sheet 2

Inventor:
Louis F. Blume,
by Harry E. Dunham
His Attorney.

Patented May 1, 1945

2,374,974

UNITED STATES PATENT OFFICE 2,374,974

ELECTRIC CIRCUIT

Louis F. Blume, Pittsfield, Mass., assignor to General Electric Company, a corporation of New York Application October 22, 1942, Serial No. 462,945

18 Claims. (Cl. 171—119)

This invention relates to the control of electric circuits and more particularly to the switching of alternating currents.

By the term "switching" is meant either the absolute interruption of a current so that it no longer exists anywhere or the relative interruption of a current whereby, for example, the current is transferred from one conductor or branch circuit to another one. General purpose switching is of the absolute interruption type but there are a number of special purpose switching arrangements of the relative interruption type.

While the present invention is useful in both types of switching, it has been found especially useful in circuits of the latter type for changing transformer taps under load, such as used in the speed control of electric locomotives and in the voltage control of electric power distribution systems and of large industrial loads. In this rapidly growing field of tap-changing, the switches, called in the trade contactors and used for local current interruption during the transfer of the load from one tap to another, have now practically reached the limit of their capacities, especially under short-circuit conditions, and it was the need for greatly increased contactor capacities that stimulated the present invention. Making these contactors "bigger and better" is not an altogether satisfactory solution of the problem, because it involves not only an added cost burden but also, in the case of electric locomotives particularly, the problem of finding space for bigger contactors.

In accordance with the present invention a plurality of impedors having different impedance angles are connected with the switch or contactor in such a way that they enable it to interrupt greatly increased currents without a proportionate increase in bulk and cost. By "impedor" is meant a device whose primary purpose is to introduce impedance into an electric circuit. It is generic to resistor and reactor, these being devices whose primary purpose is to introduce resistance and reactance respectively into an electric circuit. Reactor, in turn, is sub-generic to inductor and capacitor, these being devices whose primary purpose is to introduce inductance or inductive reactance and capacitance or capacitive reactance respectively into an electric circuit. By "impedance angle" of an impedor is meant the phase angle between an alternating current flowing through it and the voltage drop across it caused by this current. The switch or contactor is provided with at least two sets of contacts which may or may not operate together mechanically but which are connected differently with respect to the impedors so as to provide a multi-step switching system in which the two sets of contacts operate electrically, or clear, in sequence and not together. Thus the current is reduced in steps before final interruption and also the phase of the switch voltage is shifted relative to the current whereby the effective interrupting capacity of the system is greatly in excess of the sum of the interrupting capacities of its component parts. This result is further improved by the use of impedors whose impedance values are not constant but vary with the value of the current they carry. Magnetic saturation in the case of an inductor and high positive temperature coefficient of resistance in the case of a resistor give the desired non-linearity in volt-ampere characteristic.

An object of the invention is to provide a new and improved electric switching method and system.

Another object of the invention is to provide a novel and simple arrangement which enables switchgear to perform greatly increased interrupting duties.

A further object of the invention is to provide an improved arcing contactor system for transformer tap-changing-under-load circuits.

The invention will be better understood from the following description taken in connection with the accompanying drawings and its scope will be pointed out in the appended claims.

Figure 8:
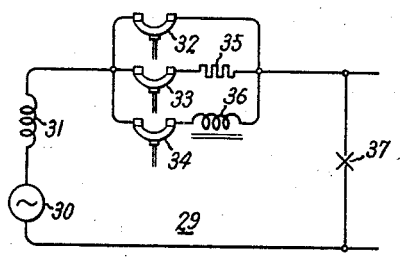
Figure 9:
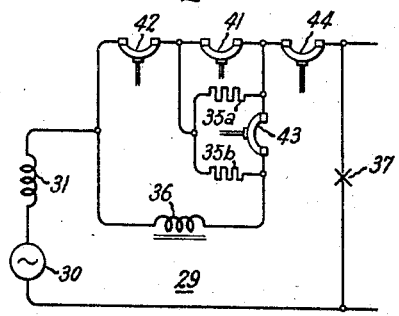
Figure 10:
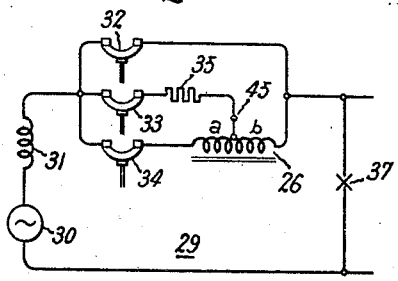
Figure 11:
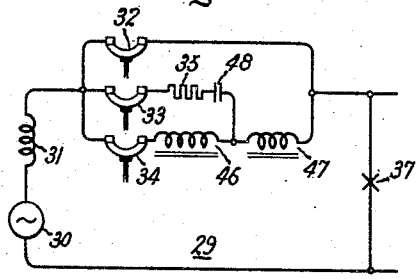

In the drawings, in which like reference characters designate the same elements throughout the different views, Fig. 1 is a diagrammatic representation of what is called in the art a "load ratio control" transformer with taps and auxiliary equipment for changing the connections of said taps to a circuit under load, without interrupting that load, modified in accordance with the present invention. Figs. 2, 3, and 4 represent intermediate positions of the tap-changing equipment of Fig. 1 during a tap-changing cycle of operations, Figs. 5 and 6 depict the current and voltage phenomena during a tap-changing operation, and help explain the performance and benefits of the invention, Fig. 7 is a modification of Fig. 1 for a more economical use of switching equipment, Figs. 8, 9, and 10 illustrate three different applications of the invention to general purpose circuit-breaker duty, and Fig. 11 represents an equivalent impedance network of the system of Fig. 10.

Considering now Fig. 1, 11 represents in conventional diagrammatic manner the low voltage winding of a transformer, and 12 its high voltage winding with terminal conductors 13' and 13'' leading to either a source or a load (not shown). In the present case the load may also be a short circuit. Winding 12 is shown with a set of taps connected to stationary contact members 14, 15, 16, and 17. Conductor 13' is selectively connected to any one of these stationary contacts by means of a tap-changing equipment comprising two movable contact members 18 and 19;

two resistors 20 and 21; four switches, which may be of the general class called "contactors", 22, 23, 24, and 25; and an inductor, also called a preventive autotransformer 26, the output terminal 13' being permanently connected to the midpoint of this inductor or autotransformer.

In the operating position shown in Fig. 1, the movable contact members 18 and 19 are seen as in direct electrical contact with the stationary contact member 15, and the arrangement will be seen to provide two parallel paths, an upper and a lower path in the sketch, for the flow of current between 15 and 13' as indicated by the arrows, one half of the load current flowing through the upper path, from 15 through contact member 18, contactors 22 and 23 and the upper half a of 26 to conductor 13'; while the other half of the current flows through the lower path from 15 through 19, 24, 25, and the lower half b of 26, to 13'. This is called the "full cycle" position of the tap-changing mechanism.

Considering the flow of current through the winding of 26, as represented by the arrows, it will be noted that the directions of the currents in its two halves are opposite to each other and that their magnetizing effects on the core of 26 are therefore neutralized. As the two halves, a and b, have to be physically separate, this flow of current tends to produce a leakage magnetization, which in turn gives rise to a small leakage-reactance voltage drop between 15 and 13'. It goes without saying that this and other reactances which arise from electromagnetic action are inductive and not capacitive. The magnitude of this voltage drop is kept to a very small fraction of the voltage between adjacent taps, such as that between 15 and 16, by interlacing the halves a and b.

If it should be desired to transfer the connection of the output terminal 13' from the contact member 15 to the contact member 16, so as to lower the output voltage of the transformer, the cycle of operations is as follows:

Step 1.—Contactor 24 is opened, introducing thereby the resistor 21 in series with the lower path of the current, that is, in series with the movable contact member 19, the contactor 25 and the lower half b of the preventive autotransformer 26. This condition of the circuit is shown in Fig. 2. On account of the increased resistance of the lower path, the current flowing from 15 to 13' will no longer divide equally between the upper and the lower paths, but more than half of it will now flow through the upper path through contactor 23, and the remaining fraction will flow through contactor 25. In general, there will be a difference not only in the magnitude of the two branch currents but also in their time phases, so that the division of the load current between the two parallel paths will be vectorial. Any reduction in magnitude, and change in phase, of the current flowing through contactor 25, as a result of inserting the resistor 21 in series with 25, materially reduces the interrupting duty on contactor 25 in the next step, as will be further described below.

Step 2.—Contactor 25 is now opened, thereby completely interrupting the flow of current through the lower path, and constraining all of the current to flow through the upper path, as indicated by the double arrows in Fig. 3. As no current now flows through the movable contact member 19, it may be and is now physically disengaged and electrically disconnected from 15, without risking any arcing or burning of the contact members. The resulting circuit condition is represented in Fig. 3. The circuit condition during which the current flows in only one half of the preventive autotransformer, as at this stage, is called the "quarter cycle" position of the tap-changing equipment.

Step 3.—The contact member 19 is now made to engage the contact member 16, then contactor 25 is closed, and then the contactor 24 is closed. The resulting circuit condition is represented in Fig. 4. This is called the "half cycle" or "bridging" position of the tap-changing mechanism, as it bridges across two taps, in the present instance those represented by 15 and 16. In this position, the load current flows once more substantially equally in the two parallel paths associated with 18 and 19, as represented by the solid arrows in Fig. 4; but now another current is superimposed on these branch currents. The voltage between 15 and 16 causes a circulating current to flow in the closed loop between 15 and 16, as indicated by the dotted arrows shown in Fig. 4, from 15 through 18, 22, 23, 26, 25, 24 and 19 to 16 and through the intermediate portion of winding 12, back to 15. This circulating current is limited by the magnetizing reactance of the full winding of the preventive autotransformer 26. We shall use the symbol X for this magnetizing reactance. That the magnetizing and not the leakage reactance of 26 will limit this current will be evident from a consideration of the fact that, as represented by the dotted arrows, the circulating current flows in both halves of 26 in the same direction, reinforcing each other's magnetizing effect on the core of 26. The magnetizing reactance of the autotransformer is preferably made such as to limit this circulating current to a value not greatly in excess of the normal rated load current in the autotransformer, so that the resultant of the two currents in the upper half of 26 (where the resultant is maximum) may not be greatly in excess of the rated load current flowing in it in the quarter cycle position shown in Fig. 3. These two currents, the circulating and the load, are generally out of phase with each other and yield a resultant apparent current in the autotransformer considerably less than their arithmetic sum, which fact makes somewhat larger circulating currents permissible.

Step 4.—Now, preparatory to the transferring of the movable contact member 18 from 15 to 16, contactor 22 is opened, thereby inserting the resistor 20 in series with the upper path, which reduces the circulating current in the loop and causes a larger fraction of the load current to flow in the lower path.

Step 5.—Contactor 23 is now opened, interrupting whatever current was left flowing in the upper path and hence through the movable contact member 18. Contact member 18 may now be and is disengaged from 15, without risking any arcing or burning, and is transferred to 16 to engage it in electrical contact in company with 19. No current, as yet can flow through 18 because the contactors 22 and 23 are open.

Step 6.—Contactor 23 is closed.

Step 7.—Contactor 22 is closed, and thus the cycle of operations of changing the tap connection of the load from 15 to 16, i. e., from one "full cycle" position to the next, is completed.

Some of the more important differences between Fig. 1 and the conventional systems and equipment for transformer tap-changing are (1) the absence from the latter of the parts 20, 21, 22 and 24 and the operations associated wtih them, (2) the structure of the preventive autotransformer, and (3) the structure or coordination or both of the resistors, contactors and the autotransformer so as to be able to change taps under larger load conditions than has been possible heretofore.

According to the present invention, the preventive autotransformer 26 is designed with a ferro-magnetic core with or without a gap in it, the cross section of the core and the number of turns of the winding being so proportioned that the core does not become magnetically saturated when the winding is subjected to the tap voltage in the bridging position. The core may become, but need not become, saturated under the magnetizing action of the normal rated load current when the entire line current flows through one half of its winding, as when the circuit of one of the parallel paths of the tap changer is interrupted and the entire current is constrained to flow in the other path, as illustrated in Fig. 3. It is, however, so constructed that if, under this circuit condition, with the entire load current flowing in only one half of the winding of the autotransformer, the current should very greatly exceed the continuous current capacity of the circuit, as when the load becomes accidentally short-circuited, the core of 26 will become magnetically saturated by the current during at least an appreciable fraction of each half cycle of the current wave.

In order better to explain the current and voltage phenomena quantitatively, the curves of Fig. 5 have been plotted for the application of the invention to a typical circuit of which the normal rated load is 5400 kva., the rated voltage of winding 12 is 13,200 volts (root-mean-square value), hence the rated load current in conductor 13' is 409 amperes (root-mean-square value). In the "full cycle" operating position of the movable contact members 18 and 19 on the same fixed contact the normal current in each half of preventive autotransformer 26 will therefore equal 204.5 amperes (root-mean-square value). The voltage of each tap step, such as the voltage between 15 and 16, is assumed to be 2.5 per cent of the rated voltage of winding 12, that is, 330 volts. The preventive autotransformer is assumed to have a small gap in its core, and the magnetizing reactance, X, of its full winding ($a+b$) is assumed to be 1.61 ohms so as to yield, in the bridging position, a circulating current of 204.5 amperes, equal to the normal rated current in each winding section $a$ and $b$. We shall refer to this reactance value as the unsaturated reactance value of winding 26. The leakage reactance between winding sections $a$ and $b$ is low enough to be negligible compared with the magnetizing reactance of 26. The magnetizing reactance of each winding section $a$ and $b$ will then be a quarter of that of the full winding, that is approximately 0.4 ohm. This also will be approximately the value of the mutual reactance between $a$ and $b$. The voltage drop across winding section $a$ for rated load in the quarter-cycle position shown in Fig. 3 will then be equal to one half of the tap-to-tap voltage.

The core of 26 saturates sharply and its reactance drops from 1.61 to 0.112 ohm when an unbalanced or circulating current of 354 amperes instantaneous value flows through its full winding. This current will be seen to be about 22 per cent higher than the crest of the circulating current in the bridging position illustrated in Fig. 4. The saturated reactance value indicated above is what is variously called the instantaneous or incremental value.

It is further assumed that the short-circuit current in the lines 13', 13" is ten times the normal rated load current in those lines, that is, 4090 amperes (root-mean-square value). In considering the duty of the tap-changing equipment under such high short-circuit currents, it is permissible to ignore the circulating current in the bridging position (Fig. 4) so as to simplify explanations. The optimum value of the resistance, R, of 21 (also of 22) may be determined by investigating the effect of various values of it. The curves of Fig. 5 are based on $R=X/3$.

Considering now Fig. 5, time is indicated as moving from left to right, and the interval $T_0$ to $T_1$ applies to the circuit condition represented by Fig. 1 during a short circuit between conductors 13' and 13". The single curve shown in this time interval and marked $I_a$ and $I_b$ represents the equal currents in the two parallel paths discussed above in connection with Fig. 1, with a maximum instantaneous value of 2900 amperes. During this interval, $T_0$ to $T_1$, there is no appreciable resistance or reactance drop between contact 15 and conductor 13', because each one of the resistors 20 and 21 is short-circuited and the preventive autotransformer offers only a leakage reactance to this distribution of current though its two halves.

At time $T_1$, when these current waves are passing through zero, contactor 24 is in the open position shown in Fig. 2, and the current path through it is definitely interrupted. The current, $I_b$, is now constrained to flow through resistor 21 and with a changed value, so that $I_a$ and $I_b$ are now different curves, $I_a$ larger and $I_b$ smaller than before. The voltage drop across 21 is equal to $I_b R$, and its curve is identified in Fig. 5 by $e_R$. As $I_a$ and $I_b$ are not equal now, their difference magnetizes the autotransformer and causes a magnetizing reactance voltage across the full winding of 26. The curve of this voltage is identified in Fig. 5 by $e_X$. It will be observed that, in the time interval $T_1$ to $T_2$ the curves $e_R$ and $e_X$ coincide with each other and appear as one curve. This arises from the fact that, under the circuit condition of Fig. 2, between the points 15 and 25 considered as two junction points, the resistor 21 and the winding 26 are in parallel with each other, and therefore their voltages must be alike. This voltage appears across the gap of contactor 24.

At time $T_2$, the resultant magnetizing effect of $I_a$ and $I_b$ (each one flowing in one half of the winding of 26 and in opposition to the other) carries the magnetization of the core of 26 to saturation density, and the (solid) curves of both current and voltage are assumed to make a sharp bend here. The dotted continuations of the curves show what the phenomena would be if the core did not saturate.

At time $T_3$, the current $I_b$, which flows through contactor 25, is passing through zero. The reason $I_a$ now leads $I_b$ in time phase by approximately ninety degrees is that $I_a$ is now largely resistance limited while $I_b$ is largely inductive reactance limited. The angle of lead would be exactly ninety degrees if the small mutual coupling through the autotransformer 26 and the resistance of its winding were not present. If the contact members of 25 are in a physically separated condition at this instant, then, even though they may have been electrically bridged across by an arc previous to this instant, there is a good likelihood of the arc going out completely at this instant so that current will not be reestablished through contactor 25. When that happens the reactance voltage $e_x$ reverses rather abruptly to the small value of about 75 volts negative and then rises slowly in the negative direction to a value of approximately 300 volts through the time interval $T_3$ to $T_5$. The reason for the reversal of $e_x$ is that $I_a$ has passed its peak value and is now decreasing whereas before it had been increasing.

As $I_b$ is zero after time $T_3$ and only $I_a$ flows in 26, therefore, $I_a$, being entirely unbalanced, magnetizes and saturates the core of 26. It is seen that during this time, and up to instant $T_6$, $I_a$ is diminishing and hence its magnetizing effect is diminishing.

At the instant $T_5$, the magnetization of the core of 26 has diminished to the borderline value below which the core is unsaturated; and as the magnetization drops below this value, the reactance voltage drop increases relatively abruptly to the value of approximately 3700 volts.

If the gap of contactor 25 resists reignition of an arc at the earlier instant $T_3$, and stays electrically unbroken through the interval $T_3$ to $T_5$, it need not break down under the high reactance voltage at the instant $T_5$, because meanwhile the gap has become larger and more completely deionized. That is, the more critical time for contactor 25 to break down is the instant $T_3$, rather than $T_5$.

If 26 did not saturate, the current $I_b$ through contactor 25 would follow the dotted extension of the curve and have a somewhat higher peak value than the solid branch of the curve and would pass through zero at the instant $T_4$. If the arc through the gap of 25 should go out at this instant, and the current not become re-established through it, the voltage $e_x$, which appears across this gap, would take a sudden plunge to about 3200 volts. While this voltage of the non-saturating reactance at time $T_4$ is somewhat less than that of the saturating reactance at time $T_5$, the former is far more dangerous than the latter, because it comes on when the current is passing through zero and the gap that was arcing has not had an appreciable chance to deionize itself and therefore has an extremely low dielectric strength; whereas the latter, coming on at time $T_5$, about 67 degrees later than the instant $T_3$ of the interruption of the current, is easily resisted by the gap because it is practically completely deionized and has regained its dielectric strength. The relative recovery-voltage duty on contactor 25, with and without saturation in 26, is therefore in the ratio of the $T_3$ value of $e_x$ to its $T_4$ value, that is, in the ratio of 50 to 3200; and this illustrates the important role of saturation in the invention.

The fact discussed in the preceding paragraph brings out one of the important features of the present invention; namely, that while ordinarily, when switching an inductive circuit, the maximum voltage across the gap of a switch coincides with the instant of the interruption of the current. In the arrangement of the present invention these two happenings, that is, the current zero and the recovery-voltage maximum, are separated from each other by a considerable time interval, allowing time for the gap to deionize and recover at least a substantial portion of its maximum dielectric strength before being subjected to the crest voltage. We may say that the current and the recovery-voltage waves are dephased from their usual relationship. In addition to this dephasing action, the resistances also dissipate energy; and the dissipation of the stored energy underlying the transient component of the recovery voltage further reduces that voltage.

The curves in Fig. 5 were calculated on the assumption that the arc drop across a switch, for instance 24, is negligible, as is generally true. However, in the lower voltage higher current circuits, this arc drop may become a substantial fraction of the reactance voltage and thereby exert dephasing and energy-dissipation effects similar to those of the resistance 21, in which case the duty on resistor 21 is reduced and 21 can be of a smaller kilowatt rating and cost. In the extremely high-current circuits, the arc across 24 might be utilized as the resistor 21 to realize a considerable fraction of the benefit from the saturation of 26.

The sequence of the opening of contactors 24 and 25 (similarly, 22 and 23) pointed out above is to be understood as the sequence of the stoppage of the current through them, rather than of their mechanical operation for it is permissible that 24 and 25 open mechanically together. When their mechanical opening is simultaneous, both will be bridged by arcs, but the arc across 24 will go out more easily and therefore first, the arc across 25 going out a substantial fraction of a cycle afterwards, as illustrated by Fig. 5.

Fig. 6 is similar to Fig. 5 except that here R is assumed to have an extremely high value, incomparably large in relation to X, so as to bring out the significance of the role played by resistance of appropriate value according to the present invention. Accordingly, we assume R equal to infinity. This would be represented by disconnecting from the circuit the resistors 20 and 21. Considering the curves of Fig. 6, the single curve of current during the interval $T_0$ to $T_1$ applies to the state of the system shown in Fig. 1. At instant $T_1$ contactor 24 is open as shown in Fig. 2, and the current through 24 is definitely interrupted. As the resistance of 21 is assumed large enough to be practically equivalent to open circuit, the wave of $I_b$ ends at this instant and is not re-established, the entire current flowing into 13' now flowing through 22 as $I_a$. At instant $T_2$ saturation sets in, and the solid extension of the curve of $I_a$ represents the saturated condition up to time $T_4$. The dotted extension of the curve represents the current when the inductor 26 does not saturate at all.

During the interval $T_0$ to $T_1$ the reactance voltage is merely a leakage-reactance drop and therefore negligible, but immediately subsequent to time $T_1$ when $I_b$ fails to be re-established and the entire current supplied to 13' flows through the winding section $a$ exclusively, this current magnetizes the core of 26, and the resulting voltage drop across the full winding of 26 jumps to the value of approximately 3675 volts as represented by the curve of $e_x$ at $T_1$. The inductor may be saturable, but at this time it cannot be saturated because the total ampere-turns acting on it is zero. If saturable as in the preceding case, saturation will set in at the instant $T_2$, and the voltage will then drop from 3600 volts to the low value of 300 volts, but this reduction, though desirable, is of no significant help to the interrupting ability of the contactor because interruption of current belongs to the instant $T_1$ when the current is passing through zero, and at that instant there is a recovery voltage of 3675 volts tending to restrike the arc if the current should fail to be re-established. Note that the crest of the recovery-voltage wave $e_x$ coincides with the zero of the current $I_a$ to be interrupted, that is, the dephasing phenomenon pointed out above in connection with Fig. 5 is absent here.

Although current interruption phenomena are very complex, involving some factors which are not yet thoroughly understood, still it is generally agreed that alternating-current interrupting duty on a switch is proportional to the kva. obtained by multiplying the R. M. S. (root-mean-square) value of the current wave through the switch with the time rate of rise of the recovery voltage across it. Accordingly, the duty imposed on the contactors in the present invention may be estimated as follows. It will be evident by symmetry that the duty on 22 will be similar to that on 24, and the duty on 23 similar to that on 25.

Considering now the duty on contactor 24, we find from Fig. 5 that the R. M. S. value of the current wave through contactor 24 is 2060 amperes under short circuit, and that the rate of rise of the recovery voltage at time $T_1$ (when the current through 24 is interrupted), that is, the slope of $e_R$ is $0.568 \times 10^6$ volts per second, assuming that the frequency of the alternating current is sixty cycles, making the interrupting duty on contactor 24 equal to $1.17 \times 10^6$ kva.

Considering the duty on contactor 25, its maximum current, assuming the reactance saturable, occurs at the instant $T_2$ (Fig. 5) with an R. M. S. value of approximately 1100 amperes. Its rate of rise of recovery voltage at the time of current interruption occurs at the instant $T_3$ with a value which depends on the oscillatory frequency of the circuit. Although the voltage $e_x$, about 75 volts at $T_3$, is shown for convenience as if rising to this value instantaneously, actually it rises to this value in a finite though very small time interval, through a series of damped oscillations of very high frequency characteristic of the circuit, as well understood in the circuit-breaker art. This frequency varies from circuit to circuit and through a wide range, from a few thousand cycles to hundreds of thousands of cycles per second. For purposes of illustration, we shall assume that in the present case the oscillatory frequency of the circuit is an intermediate value, say 10,000 cycles. This makes the maximum rate of rise of $e_x$ during its first quarter cycle of oscillation equal to $2\pi \times 10,000 \times e_x$, that is, $4.77 \times 10^6$ volts per second, and the kva. duty on contactor 25 becomes $5.25 \times 10^6$.

The results of these calculations and similar other calculations for other assumptions when tabulated give us an exhibit of switching duties as follows:

|  | $\frac{R}{X}=\frac{1}{3}$ | $\frac{R}{X}=1$ | $\frac{R}{X}=\alpha$ |
|---|---|---|---|
| Reactance saturable: |  |  |  |
| Contractor 24 | $1.17\times10^6$ | $3.63\times10^6$ | $4800\times10^6$ |
| Contractor 25 | $5.25\times10^6$ | $0.736\times10^6$ | 0 |
| Reactance nonsaturable: |  |  |  |
| Contractor 24 | $1.17\times10^6$ | $3.63\times10^6$ | $4800\times10^6$ |
| Contractor 25 | $300\times10^6$ | $126\times10^6$ | 0 |

Comparing the figures falling in the first two rows and columns, it is seen that adjusting $R/X$ to $\frac{1}{3}$ puts a greater duty on contactor 25, while $R/X=1$ puts a greater duty on contactor 24, and that a value of $R/X$ intermediate these two values will equalize the switching duty on the two contactors with an estimated kva. interrupting duty of the general order of only $2\times10^6$. As against this, if a resistance step is utilized but no saturation is utilized, then, for the same short-circuit current, $R/X=\frac{1}{3}$ imposes a duty of $300\times10^6$ on contactor 25, and $R/X=1$ imposes a duty of $126\times10^6$. If saturation is utilized, but no finite resistance step is utilized, for the same short-circuit current the maximum switching duty falls on contactor 24 and is equal to $4,800\times10^6$.

It is thus seen that for a given system load or short-circuit current, the combined use of an appropriate resistance switching step and reactance saturation will reduce the switching duty on the circuit interrupting means by many times, or, alternatively, that a given set of switches can be enabled to control many times as large system kva. as their maximum capacity in the present-day conventional practice.

Fig. 7 illustrates diagrammatically a modification of Fig. 1, wherein the kva interrupting duty imposed on two of the four switches 22, 23, 24 and 25 is negligible, and those two will therefore be practically free from arcing, permitting a less expensive construction and yet with an indefinitely long life. In addition, one of the resistors 20 and 21 is eliminated, thus further simplifying the circuit. These results are accomplished by separating the halves $a$ and $b$ of the preventive autotransformer 26 so as to form what might be called a split inductor. Half $a$ is connected between ratio adjuster 18 and main circuit conductor 13' in series with switch 24, and half $b$ is connected between ratio adjuster 19 and main circuit conductor 13' in series with switch 25. Switches 22 and 23 are connected in series with each other between the terminals of the halves $a$ and $b$ of the reactor which are connected respectively to the switches 24 and 25. The resistor 20 is connected across the switch 22.

The operation of Fig. 7 is as follows: The parts are shown in their full-cycle position and if it is desired to move ratio adjuster 19 out of engagement with tap contact 15 and into engagement with tap contact 16 so as to pass through the quarter-cycle position to the half-cycle or bridging position the switch 25 is first opened. As this switch is short-circuited by the other three switches it performs practically no arcing duty so that it can be made quite inexpensively. Switches 22 and 23 are now opened either simultaneously or in the order mentioned, thus interrupting the current through the ratio adjuster 19, as has previously been explained in connection with Figs. 1–6, inclusive. Contact 19 can now be moved without danger of any arcing as it is carrying no current and can then be moved into engagement with contact 16. Switches 22 and 23 are then closed and finally switch 25 is closed. When it is desired to move the ratio adjuster 19, switch 24 is first opened but as this switch is now short-circuited by switches 22, 23 and 25 it will be seen that it performs no arcing duty when it opens. Switches 22 and 23 are then opened thereby to interrupt the current in the ratio adjuster 18.

It should, of course, be understood that the opening of switches 22 and 23 combined with the saturation of the core of the split reactor 26 imposes switching duties on the switches 22 and 23 which are similar to the switching duties imposed on the similarly numbered switches in Figs. 1-4, inclusive.

Fig. 8 illustrates diagrammatically a general purpose circuit-breaker application of the invention, that is, its application to the interruption of the short-circuit current of a power system 29, comprising a generator 30, an impedor 31 representing the generator and other system impedances and a short circuit at 37. The control means according to the present invention includes the switches 32, 33, and 34, a resistance 35 and a saturable inductor 36. In the normal operation of the system, the control switches are closed as shown, and the control impedances 35 and 36 are short-circuited as shown. To clear the short-circuit current caused by the fault at 37, switch 32 clears first, then 33 clears, and then 34 clears, completing the circuit interruption. That the kva. interrupting duty imposed on these switches is substantially reduced as compared with that on a single circuit breaker used in a conventional manner, may be seen by considering that while switch 32 interrupts full current, the rate of rise of its recovery voltage is very small both because the crest value of the recovery voltage is a fraction of that of the system voltage and (what is far more important) the front of the wave of the recovery voltage is that of a 60 cycle wave, not an abrupt or high frequency rise. The kva. interrupting duty on 33 is also a fraction of that of the conventional circuit-breaker duty both because it interrupts only a fraction of the original short-circuit current and (what is far more important) the interruption takes place at an instant when 36 is saturated and the magnitude of the recovery voltage is a fraction of the system voltage. Finally, the duty on 34 is reduced because although its recovery voltage is of the same general nature as that of a conventional breaker, the effective value of the current which it interrupts is reduced with the help of reactor 36 which is absent in conventional breaker practice.

Fig. 9 is a modification of Fig. 8 in which two resistors instead of one, and four switches instead of three, are utilized. To clear a short circuit at 37, the switches clear in the sequence 41, 42, 43 and 44. They may open in this mechanical sequence or may all open simultaneously.

The opening of switch 41 inserts in series with the circuit three impedors, namely, the resistor 35a, the resistor 35b, and the saturable core inductor 36, all three in parallel with each other. The opening of switch 42 removes the resistors, leaving only the inductor, whereby the impedance in series with the short circuit is increased. The opening of switch 43 inserts the resistors 35a and 35b in series with the circuit, thereby further increasing the impedance in series with the short circuit. Finally, the opening of switch 44 completely interrupts the flow of current.

Just as the falling off of the inductance of the inductor element, as by saturation, greatly improves the performance of the invention, so also a falling off of the conductance of the resistor element, as for instance by an increase in its temperature from the time it is cut into the circuit to the time when it is cut out, improves the performance of the invention. This latter advantage results not only from an increase in the dephasing effect of the resistance, but also from an increase in another effect thereof, namely, the dissipation of the stored energy of the circuit and reduction of the crest voltages and rates of rise of the recovery voltages. As this time interval for the production of this effect is a very small fraction of a second, and as the permissible temperature rises for circuit elements are generally limited, I propose to utilize for this purpose resistors which have high positive temperature coefficients of resistance, such as, for instance, what is known in the trade as "hitemco" wire, which is characterized with a very rapid falling off in conductance with a moderate increase in temperature.

Fig. 10 illustrates a modification of Fig. 9 in which the simple inductor 36 of Fig. 8 is replaced by an autotransformer type inductor similar, for instance, to the autotransformer 26 of Fig. 1. As the replaced inductor had two terminals and the replacing inductor has three, the connections of the system are modified by connecting one end of 35 to the intermediate terminal 45 of 26. The steady state equivalent network of this system is shown in Fig. 11 in which 46 and 47 are simple inductors not coupled with each other, and 48 is a capacitor.

If 45 in Fig. 10 is a midtap terminal, and the winding sections a and b are very closely coupled, then in the equivalent network shown in Fig. 11, the inductors 46 and 47 will have equal ohmic values, and 48 will have an ohmic value approximately one-half of that of 46.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. Control means for an alternating-current circuit comprising, in combination, switch means for opening said circuit, at least two impedors having different impedance angles connected into said circuit, the impedance of one of said impedors being substantially variable under the action of a flow of current therethrough, said impedance variation being independent of the direction of said current flow, and additional switching means for modifying the connections of said impedors in said circuit selectively in a predetermined sequence to reduce the interrupting duty of said first-mentioned switch means.

2. Control means for an alternating-current circuit comprising, in combination, switch means for opening said circuit, at least two impedors having different impedance angles connected into said circuit, one of said impedors being inductive and having a magnetically saturable core, and additional switch means for modifying the connections of said impedors in said circuit selectively in a predetermined sequence to reduce the interrupting duty of said first-mentioned switch means.

3. Control means for an alternating-current circuit comprising, in combination, switch means for opening said circuit, at least two impedors having different impedance angles connected into said circuit, one of said impedors being resistive and characterized by a diminishing conductance under the action of a flow of current therethrough regardless of the direction of said flow of current, and additional switch means for modifying the connections of said impedors in said circuit selectively in a predetermined sequence to reduce the interrupting duty of said first-mentioned switch means.

4. Control means for an alternating-current circuit comprising, in combination, switch means for opening said circuit, at least two impedors having different impedance angles connected into said circuit, one of said impedors being inductive and having a magnetically saturable core structure, the other of said impedors being resistive and being characterized by reduced conductance due to an increase in its temperature, and additional switch means for modifying the connections of said impedors in said circuit selectively in a predetermined sequence to reduce the interrupting duty of said first-mentioned switch means.

5. An alternating-current switching system comprising, in combination, an alternating-current circuit, a plurality of impedors having different impedance angles, and a plurality of switches, at least one of said impedors and one of said switches being connected in parallel circuit relation with each other in said circuit whereby the opening of said switch reduces the current in said circuit, said last-mentioned impedor being resistive in character, at least one other of said impedors and one other of said switches being connected in series circuit relation with each other in said circuit whereby the opening of said other switch interrupts said current, said other impedor being a saturable core inductor.

6. In combination, an alternating-current circuit having at least two parallel branches, impedance means with different impedance angles connected in said branches, at least one of said impedance means being normally effectively short-circuited, means for opening said short circuit whereby the currents in said branches become dephased, and means for opening one of said branches.

7. The combination as in claim 6 in which said normally short-circuited impedance means is resistive and the other impedance means is inductive.

8. The combination as in claim 6 in which said normally short-circuited impedance means has a positive temperature coefficient of resistance and the other impedance means is a saturable core inductor.

9. The method of interrupting the flow of current in an alternating-current system which includes the steps of (a) introducing impedance in series with a portion of said system to modify the current to be interrupted, (b) opening the circuit of said modified current, and (c) causing the recovery voltage following the interruption of said current to have a distorted wave shape with a crest value and a zone of substantially lower values in the neighborhood of said crest value, the time phase of said zone of lower values coinciding with the zero instant of said current to be interrupted.

10. The method of interrupting the flow of current in an alternating-current system which includes the steps of (a) introducing impedance in series with a portion of said system to modify the current to be interrupted, (b) opening the circuit of said modified current, and (c) distorting the wave shape of the recovery voltage following the interruption of said modified current from a sine wave form so as to provide in the neighborhood of the crest value of a half cycle of said wave a zone of substantially lower values than correspond to a sine wave of a maxium value equal to said crest value and of a frequency equal to the frequency of said voltage.

11. In an alternating-current system, voltage control means comprising, in combination, a transformer having a winding provided with at least two taps at different potentials, each one of said taps being connected to a main contact member, a pair of auxiliary contact members arranged to make contact selectively with said main contact members, each one of said pair of auxiliary contact members constituting one terminal of one of a pair of circuits connected together at their other terminals, each one of said pair of circuits including an inductive element, said inductive elements being closely coupled with each other, switch means for interrupting the flow of current in one of said circuits, impedance means, and switch means arranged to introduce said impedance means in series with said last-mentioned circuit for dissipating a portion of the energy of said circuit as a function of said current when said last-mentioned switch means is opened.

12. In combination, a transformer winding having a plurality of taps, a pair of tap changers for selectively making connection to said taps, a midtapped inductor, a circuit for said winding one side of which is connected to said winding and the other side of which is connected to the midtap of said inductor, two pairs of switches serially connected respectively between said tap changers and the terminals of said inductor, and a pair of resistors connected respectively across one switch of each pair.

13. The combination as in claim 12 in which said inductor has a core which saturates at a value of unbalanced current therethrough which is substantially in excess of the rated current of said winding.

14. The combination as in claim 12 in which said resistors have optimum values such that the interrupting duty of the switches of each pair are substantially equal.

15. In combination, a transformer winding provided with a plurality of taps, a pair of ratio adjusters for selectively making connection to said taps, a pair of selector switches for respectively connecting said ratio adjusters to one side of a circuit for said winding, a split inductor having its halves serially connected respectively between said ratio adjusters and their associated selector switches, said inductor having a core which saturates when an unbalanced current substantially in excess of the rated current of said circuit flows through its winding, a pair of contactors connected in series with each other between the terminals of said selector switches which are connected to said inductor, and a resistor connected across one of said contactors.

16. The combination as in claim 15 in which said contactors are simultaneously operable and said resistor has a relatively high positive temperature coefficient of resistance.

17. In combination, an alternating-current circuit, a pair of normally short-circuited impedors having different impedance angles, three switches, and means for so interconnecting said impedors and said switches that the opening of one switch inserts said impedors in parallel circuit relation with each other in said circuit, the opening of the second switch open-circuits one of said impedors, and the opening of the third switch opens said circuit through the remaining one of said impedors.

18. The combination as in claim 17 in which one of said impedors is a resistor and the other is a saturable core inductor.

LOUIS F. BLUME.